United States Patent [19]
Lang

[11] Patent Number: 5,294,163
[45] Date of Patent: Mar. 15, 1994

[54] CARRIER DEVICE FOR ICE FISHING APPARATUS

[76] Inventor: Jeffrey J. Lang, 102A South Dr., Circle Pines, Minn. 55014

[21] Appl. No.: 986,350

[22] Filed: Dec. 7, 1992

[51] Int. Cl.⁵ ............................ A45F 5/00; A47F 7/00
[52] U.S. Cl. .................................. 294/161; 294/146; 211/70.8
[58] Field of Search ............... 294/137, 143, 146, 147, 294/159, 161, 162, 163; 211/70.2, 70.5, 70.8, 41

[56] References Cited

U.S. PATENT DOCUMENTS

| | | | |
|---|---|---|---|
| D. 106,682 | 10/1937 | Desser | 294/143 X |
| D. 164,503 | 9/1951 | Kerr | 211/70.2 X |
| 2,024,484 | 12/1935 | Smith | 294/159 X |
| 3,628,708 | 12/1971 | Daughrty | 294/161 |
| 4,269,337 | 5/1981 | Sobotka | 294/163 |
| 4,319,616 | 3/1982 | Light | 294/146 X |
| 4,526,414 | 7/1985 | Jones | 294/146 X |
| 4,779,914 | 10/1988 | Friedline | 294/161 X |
| 5,071,048 | 12/1991 | Price et al. | 294/159 X |

Primary Examiner—David M. Mitchell
Assistant Examiner—Dean J. Kramer
Attorney, Agent, or Firm—Palmatier, Sjoquist and Helget

[57] ABSTRACT

The invention relates to a carrier for transporting "tip-up" devices used by ice fishermen. The invention includes a pair of opposite side supports having aligned inclined slots for receiving engagement of a plurality of ice fishing "tip-ups". The pair of side supports also include a plurality of aligned apertures for receiving engagement of a line for holding bobbers and/or sinkers. The carrier includes a handle attached to and traversing between the top of the side supports. The carrier also includes a base having braces affixed to the side supports proximal to the foot portions of the invention. The carrier provides an ice fisherman with the ability to transport a plurality of "tip-up" devices for use in fishing without fear of entanglement of the "tip-ups" to each other or the invention.

11 Claims, 2 Drawing Sheets

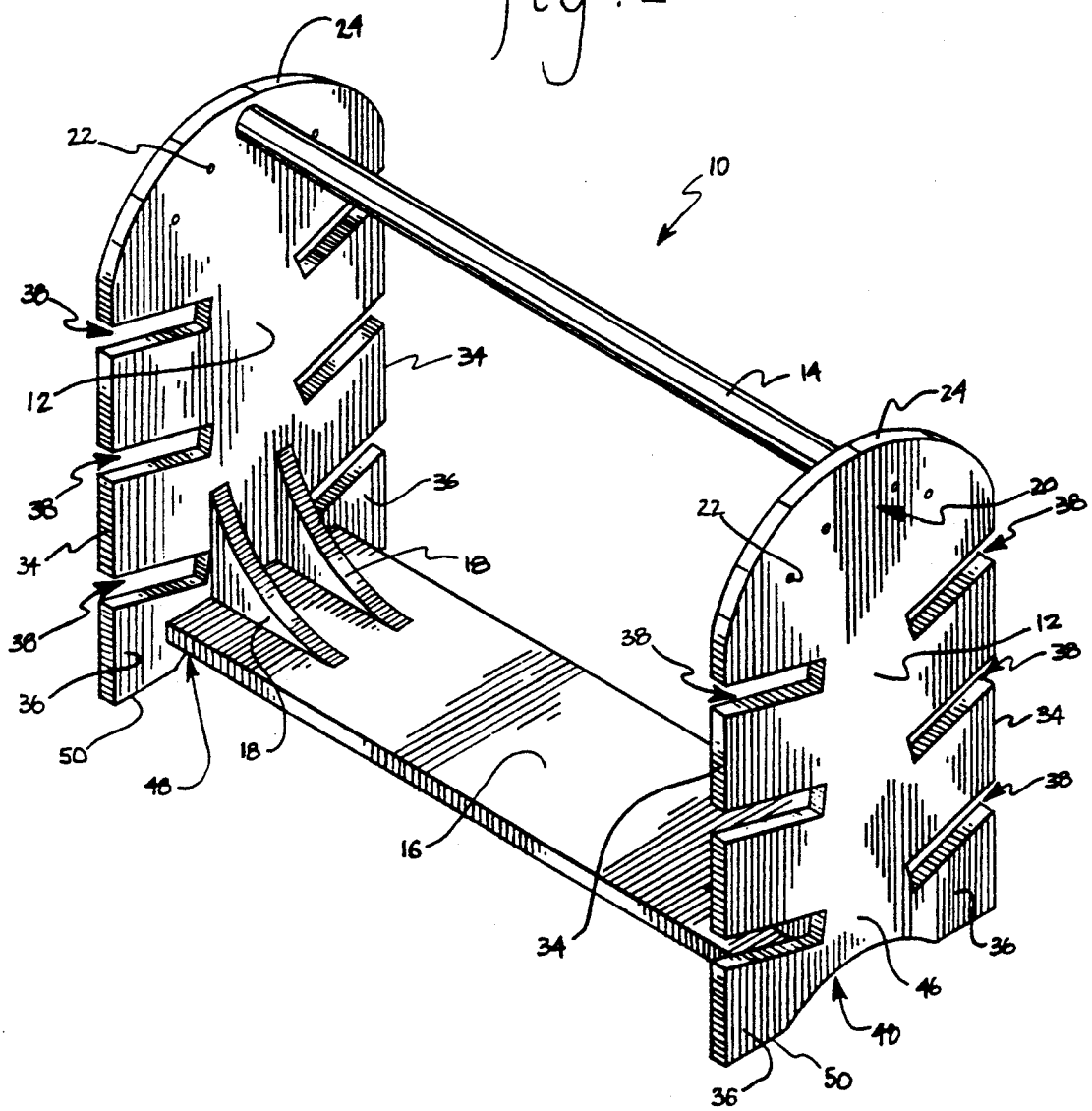

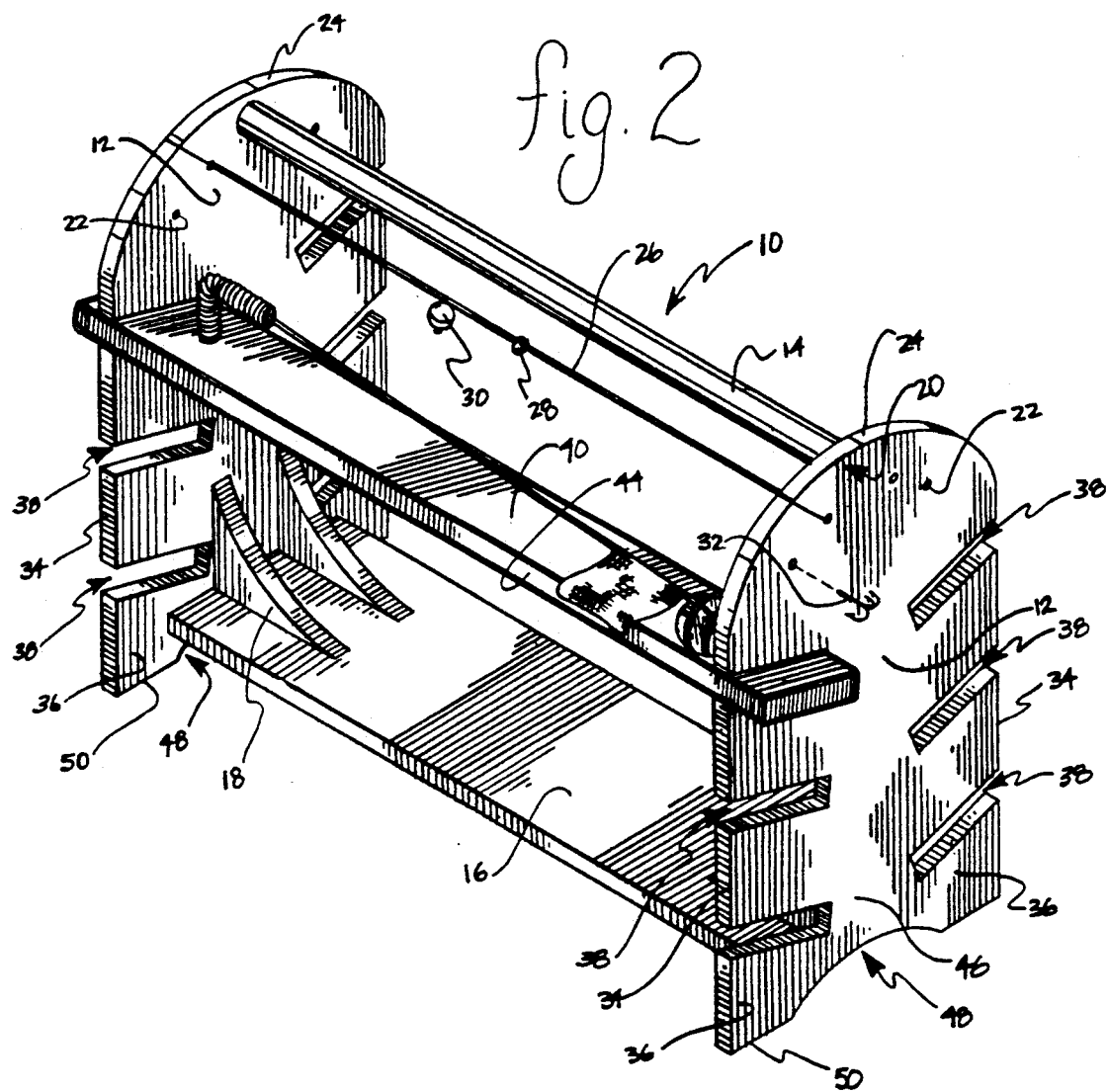

CARRIER DEVICE FOR ICE FISHING APPARATUS

BACKGROUND OF THE INVENTION

The present invention relates to a carrier for use in the transportation of "tip-up" devices as used by ice fisherman. The transportation of these types of fishing apparatus is difficult. During transportation, the line of a "tip-up" will frequently become tangled with other "tip-up" devices. In addition, a "tip-up" is frequently dropped during relocation as a result of the bulky and cumbersome shape of the device.

Generally, a "tip-up" ice fishing device includes a rectangular base and a spring loaded arm member having a flag. The arm member is released to an upright configuration upon the striking of the bait by a fish. The spring loaded arm member and the line of the "tip-up" renders transportation of the apparatus very inconvenient.

No carrier, as known, exists to easily and expediently organize a number of "tip-up" ice fishing units during transportation. The present invention provides a convenient carrier for a plurality of "tip-up" ice fishing devices. The invention prevents entanglement between the transported devices which significantly improves the utility to an ice fisherman.

SUMMARY OF THE INVENTION

The invention relates to a carrier for transporting "tip-up" devices used by ice fishermen. The invention includes a pair of opposite side supports having aligned inclined slots for receiving engagement of a plurality of ice fishing "tip-ups". The pair of side supports also include a plurality of aligned apertures for receiving a line for holding bobbers and/or sinkers. The carrier includes a handle attached to and traversing between the top of the side supports. The carrier also includes a base having braces affixed to the side supports proximal to the foot portions of the invention. The carrier provides an ice fisherman with the ability to transport a plurality of "tip-up" devices for use in fishing without fear of entanglement of the "tip-ups" with each other or the invention.

It is a principle object of the present invention to provide a new and improved carrier for "tip-ups" used by ice fisherman, where the carrier is of relatively simple and inexpensive design, construction, and operation for use in the transportation of "tip-up" devices to a desired location without fear of loss or damage to the devices and/or injury to persons.

Another object of the present invention is to provide a carrier which sufficiently isolates individual "tip-up" devices to eliminate entanglement between the devices during transportation.

Still another object of the present invention is to provide a relatively lightweight device of open and sturdy construction which will not fracture or break when exposed to strenuous and frigid operating conditions upon a frozen lake or river.

Still another object of the present invention is to provide a "tip-up" carrier device which may be used to transport additional ice fishing apparatus.

A feature of the present invention includes a pair of opposite side supports having a plurality of aligned notches for individual receiving engagement of a "tip-up" ice fishing device.

Another feature of the present invention includes a plurality of apertures traversing the pair of opposite side supports where the apertures are adapted to receive line for holding bobbers and sinkers used by an ice fisherman.

Still another feature of the present invention includes a handle for use by a fisherman where the handle additionally provides a location for hanging ice fishing apparatus during transportation of the carrier to a desired location.

Still another feature of the present invention includes a base having braces providing sturdy support for the invention.

Still another feature of the present invention includes an open interior which may be used for the transportation of additional ice fishing apparatus.

BRIEF DESCRIPTION OF THE DRAWINGS

FIG. 1 is an isometric view of the invention.

FIG. 2 is an isometric view of the invention showing engagement to a "tip-up" device.

DETAILED SPECIFICATION OF THE PREFERRED EMBODIMENT

One form of the invention is illustrated and described herein. The "tip-up" carrier is indicated in general by the numeral 10. The carrier 10 is preferably formed of wood. The carrier 10 may be formed of plastic, metal, and/or a combination of wood, plastic or metal material at the discretion of an individual. In general, the carrier 10 has a pair of opposite side supports 12, a handle 14, a base 16, and a plurality of braces 18.

Each of the opposite side supports 12 has a top portion 20. The top portion 20 preferably is semicircular in shape; however, the top portion 20 may be square or any other geometrically preferred shape at the preference of an individual. A plurality of apertures 22 preferably traverse the top portion 20 through each of the pair of opposite side supports 12. Preferably the apertures 22 are positioned proximal to, and equal distances from, the first edge 24 of the opposite side supports 12. Preferably, the apertures 22, through each of the opposite side supports 12, are longitudinally aligned and adapted for receiving engagement of a line 26. The line 26 preferably provides to a fisherman a convenient location for affixation of sinkers 28 and/or bobbers 30 during transportation of the carrier 10. Alternatively, the apertures 22 may suitably engage a fish hook 32 during transportation and/or use of the carrier 10.

Each of the pair of opposite side supports 12 has a pair of exterior edges 34. The exterior edges 34 are preferably perpendicular to the base 16 and extend vertically from the foot portions 36 to the first edge 24.

A plurality of rectangular shaped slots 38 are preferably milled from each of the opposite side supports 12 proximal to each of the exterior edges 34. The slots 38 are preferably evenly spaced vertically along each of the exterior edges 34 between the foot portions 36 and the first edge 24. An identical number of slots 38 preferably traverse each exterior edge 34. Preferbly, the slots 38 are horizontally aligned across the exterior edges 34 of an individual opposite side support 12 In addition, the slots 38 are longitudinally aligned along adjacent exterior edges 34 of both opposite side supports 12. The slots 38 are preferably adapted for sliding and receiving engagement of a "tip-up" ice fishing device 40. "Tip-up" devices 40 are manufactured by numerous corporations, one example of which is the Artic Fisherman TM of Beaver Dam, Wis. Preferably, the longitudinal alignment of the slots 38, between both opposite side supports 12, provides for the level storage of a plurality of "tip-up" ice fishing devices 40 during transportation of the carrier 10. During transportation of the carrier 10, the position of a "tip-up" device 40 is not involuntarily shifted toward one or the other [f the opposite side supports 12.

In the preferred embodiment, three slots 38 are horizontally and longitudinally aligned along each exterior edge 34 of the opposite side supports 12. Each slot 38 is preferably rectangular in shape and extends centrally inward and downward from the exterior edge 34.

The slots 38 preferably depend at an angle of twenty degrees centrally and downwardly from horizontal with respect to the exterior edges 34. The angle incidence of the slots 38 may be suitably varied between ten and forty-five degrees at the preference of an individual without sacrifice of the essential features and attributes of the carrier 10 as described herein.

The central inward and downward angular alignment of the slots 38 prevent involuntary separation of the "tip-up" devices 40 from the carrier 10 during use. Gravitational forces, in conjunction with the central inward and downward angular alignment of the slots 38, prevent involuntary disengagement of a "tip-up" device 40, so long as the carrier 10 is maintained in an upright configuration. Preferably, the depth of the slots 38 is sufficient for the flush engagement between the distal edge 44 of the "tip-up" device 40 and the exterior edge 34 of the opposite side support 12. The slots 38 do not adversely affect the structural strength and durability of the carrier 10.

Each opposite side support 12 has a bottom portion 46. Each opposite side support 12 has a depression 48 centrally positioned between the exterior edges 34 proximal to the bottom portion 46. The depression 48 defines the pair of foot portions 36 positioned proximal to the bottom portion 46 and the exterior edges 34. Each of the foot portions 36 support the carrier 10 in an upright configuration upon a solid and/or frozen surface.

In the preferred embodiment, the slots 38 are spaced 2¾ inches apart, initiating at a position above the second edge 50 of the opposite side supports 12. Preferably the width of each slot, traversing the exterior edges 34, is 1⅝ inches in thickness. The upper portion of each slot 38 preferably extends centrally inward and downward from each exterior edge 34 a length of 3 5/16 inches. The lower portion of each slot 38 preferably extends centrally inwardly and downwardly from each exterior edge 34 a length of 3 inches. Preferably, the inflection point of the central depression is 1 inch above the second edge 50. In the preferred embodiment, the height, width, and thickness dimensions of each of the opposite side supports 12 are fifteen inches, nine inches, and ⅝ or ¾ inches, respectively.

The dimensions indicated herein have been provided for illustrative purposes only. The dimensions for the carrier 10, pair of opposite side supports 12, and slots 38 may be suitably varied to any preferred dimension at the discretion of an individual. The individual dimensions have been provided to show one of the numerous forms of this invention.

The handle 14 is affixed to and centrally traverses between the top portion 20 of each of the opposite side supports 12. The handle 14 is preferably formed of wooden material; however, the handle 14 may be formed of plastic or metal material at the discretion of an individual. The handle 14 is preferably cylindrical in shape having a diameter of ¾ inches and a length of 9¾ inches. The handle 14 may, however, be square, or any other geometric shape at the preference of an individual. The dimensions of the handle 14 may be varied to conform to the dimensions selected for the pair of opposite side supports 12 and the carrier 10. The handle 14 is preferably affixed to the pair of opposite side supports 12 by the use of wood screws. The handle 14 may be suitably affixed to the pair of opposite side supports 12 by any preferred means including but not limited to nails, epoxy adhesives, bolts and nuts, pins, and/or rivets at the discretion of an individual.

The handle 14 may be grasped by an individual for transportation of the carrier 10. The handle 14 is of sufficient strength to not fracture or break during transportation of a carrier 10 containing a plurality of "tip-up" ice fishing devices 40 and/or other ice fishing apparatus. In addition, the handle 14 and the pair of opposite side supports 12 may be of sufficient strength to not fracture or break if the carrier 10 is used as a chair by an individual while ice fishing. The handle 14 may also be used as the location for attachment of additional ice fishing apparatus including but not limited to ladles, stringers, fish hook removers, and/or containers as desired by an ice fisherman. These additional ice fishing apparatus may be transported in the open interior of the carrier 10. The handle 14 preferably is located centrally, traversing between both the opposite side supports 12, above the open interior of the carrier 10.

The base 16 is affixed to and centrally traverses between the pair of opposite side support 12 proximal to the bottom portion 46, above the depressions 48. The base 16 is centrally positioned equal distances between the exterior edges 34 of the pair of opposite side supports 12. The base 16 is preferably formed of wood material; however, the base 16 may be formed of plastic or metal material at the discretion of an individual. The base 16 is preferably flat and rectangular in shape having a length of 19¾ inches, a width of 5¾ inches, and a thickness of ⅝ or ¾ inches. The dimensions of the base 16 may be varied to conform to the dimensions selected for the pair of opposite side supports 12 and the carrier 10. The base 16 is preferably affixed to the pair of opposite side supports 12 by the use of wood screws. The base 16 may be suitably affixed to the pair of opposite side supports 12 by any preferred means including but not limited to nails, epoxy adhesives, bolts and nuts, pins, and/or rivets at the discretion of an individual.

The base 16 provides structural strength and stability to the carrier 10. The base 16 is of sufficient strength to not fracture or break during transportation of a carrier 10 containing "tip-up" ice fishing devices 40 and/or other ice fishing apparatus. The base 16 may also provide sufficient strength to prevent fracture or breakage of the carrier 10 when used by an individual as a chair during ice fishing. The base 16 does not interfere with the sliding receiving engagement of "tip-up" devices 40 by the slots 38 proximal to the bottom portion 46 of the carrier 10. The base 16 is affixed to the pair of opposite supports 12 at least one inch above the second edge 50. The elevation of the base 16, above the second edge 50, permits the penetrating engagement of the foot portions 36 into compacted snow and/or ice during use of the carrier 10 upon a frozen lake and/or river.

At least one brace 18 is centrally affixed to each of the pair of opposite side supports 12 and the base 16. In the preferred embodiment, a pair of braces 18 are affixed to each of the pair of opposite side supports 12 and the base 16. The braces 18 are positioned and centrally spaced interior to the pair of slots 38 proximal to the bottom portion 46 of each of the pair of opposite side supports 12.

The braces 18 are preferably formed of wood material; however, the braces 18 may be formed of plastic or metal material at the discretion of an individual. The braces 18 are preferably flat and triangular in shape having a length, height, and hypotenuse dimension of 4¼ inches, 2¾ inches, and 5 inches, respectively. The thickness of the braces may be either ⅜ inch or ¼ inch at the discretion of an individual. The dimensions of the braces 18 may be varied to conform to the dimensions selected for the pair of opposite side supports 12, base 16, and carrier 10. The braces 18 are preferably simultaneously affixed to the pair of opposite side supports 12 and the base 16 by the use of wood screws. The braces 18 may be suitably affixed to both the pair of opposite side supports 12, and the base 16, by any preferred method including but not limited to, nails, epoxy adhesives, bolts and nuts, pins, and/or rivets at the discretion of an individual.

The braces 18 provide structural strength and support to the base 16 and the pair of opposite side supports 12 stabilizing and preventing lateral movement of the pair of opposite side supports 12 and/or the carrier 10. The braces 18 are positioned perpendicular to both the pair of opposite side supports 12 and the base 16. The braces 18 are affixed to base 16 and the pair of opposite side supports 12 opposite to the depressions 48. The braces 18 are of sufficient strength to not fracture or break during transportation of a carrier 10 containing a plurality of "tip-up" ice fishing devices 40 and/or other ice fishing apparatus. The braces 18 may also provide sufficient strength to prevent fracture or breakage of the carrier 10 when the carrier 10 is used by an individual as a chair during ice fishing. The braces 18 do not interfere with the sliding receiving engagement of a "tip-up" device 40 into a slot 38 proximal to the bottom portion 46 of the carrier 10.

An ice fisherman may grasp the handle 14 for transportation, thereby maintaining the carrier 10 in an upright configuration. A carrier 10 transported in this manner does not permit the sliding movement of a "tip-up" device 40 engaged to a slot 38. The upright configuration of the carrier 10 also prohibits disengagement of a "tip-up" device 40 outwardly from a slot 38.

In operation, an ice fisherman slides a plurality of "tip-up" devices 40 into the slots 38 in a manner similar to sliding shelves into a cabinet and/or bookcase. Convenient storage and retrieval of a "tip-up" device 40 is thereby provided to an ice fisherman. In addition, the slots 38 may be used for transportation of other ice fishing apparatus. The slots 38 may be used to transport items such as ice chisels, poles, flags, gaffs, and/or spears where permitted for use in ice fishing. The carrier 10 may also be used by an ice fisherman as a chair or stool.

The carrier 10 is formed of sturdy material for use in adverse weather and temperature conditions. The carrier 10 formed of wood material may be treated with water retardant substances, such as verathane, as known in the art.

The width of the base 16, and the pair of opposite side supports 12, are of sufficient dimensions to prevent inadvertent overturning of a carrier 10 when the slots 38 of only one side of the carrier 10 are engaged to "tip-up" devices 40.

The exterior of the carrier 10 may be used for the affixation of ice fishing devices such as knife sheaths, towels, thermometers, bottle openers, and/or reflectors at the preference of an ice fisherman. The affixation of reflectors to the exterior of the carrier 10 improves the visibility of the device to snowmobile operators and/or motor vehicles traveling on ice.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A carrier for transporting ice fishing "tip-up" apparatus, said carrier comprising:
    (a) a pair of opposite side supports, each of said side supports having a top portion having a plurality of longitudinally aligned apertures, a pair of opposite edges having a plurality of rectangular slots, wherein said plurality of slots of each of said side supports are aligned to each other and said plurality of slots depend centrally inward and downward from said opposite edges, and a lower portion having a depression defining a pair of feet, where said depressions are centrally positioned between said opposite edges of each of said side supports, said feet being positioned proximal to said opposite edges of each of said side supports;
    (b) a handle affixed to and traversing between said top portion of each of said side supports;
    (c) a rectangular base affixed to each of said side supports above said depressions, said base being centrally positioned between each of said opposite edges of each of said side supports; and
    (d) at least two braces affixed to each of said side supports and said base.

2. The carrier according to claim 1, wherein each of said braces is affixed to said side supports and said base opposite to said depressions.

3. The carrier according to claim 2, wherein said top portion is semicircular in shape.

4. The carrier according to claim 2, wherein each of said depressions is semicircular in shape.

5. The carrier according to claim 2, wherein said carrier is formed of wood.

6. The carrier according to claim 2, wherein said handle is cylindrical in shape.

7. The carrier according to claim 2, wherein each of said slots depend inwardly and downwardly from said opposite edges at an angle of 20 degrees.

8. A carrier for transporting ice fishing "tip-up" devices, said carrier comprising:
    (a) a pair of opposite side supports, each of said side supports having a semicircular shaped top portion having a plurality of apertures, wherein said apertures are longitudinally aligned to each other, each of said side supports further having a pair of opposite edges having a plurality of slots where each of said slots are longitudinally aligned to each other, said plurality of slots depending centrally inward and downward from said opposite edges, each of said side supports further having a lower portion having a semicircular shaped depression centrally located between said opposite edges where said depressions define a pair of foot portions proximal to said opposite edges of said side supports;

(b) a cylindrically shaped handle affixed to and traversing between said top portion of each of said side supports;

(c) a rectangular shaped base affixed to each of said side supports centrally positioned between each of said opposite edges above said depressions; and (d) a pair of braces affixed to each of said side supports and said base, said pair of braces positioned on said base opposite of said depressions.

9. A carrier for transporting ice fishing "tip-up" apparatus, said carrier comprising:

(a) a pair of opposite side supports, each of said side supports having a semicircular top portion having a plurality of longitudinally aligned apertures, a pair of opposite edges having a plurality of rectangular slots, said plurality of slots of each of said supports being aligned to each other, said plurality of slots depending centrally inward and downward from said opposite edges, and a lower portion having a semicircular depression defining a pair of feet, each of said depressions being centrally positioned between said opposite edges of each of side supports, and each of said feet being positioned proximal to said opposite edges of each of said side supports;

(b) a cylindrically handle affixed to and traversing between said top portion of each of said side supports;

(c) a rectangular base affixed to each of said side supports above said depressions, said base being centrally positioned between each of said opposite edges of each of said side supports; and (d) at least two braces affixed to each of said side supports and said base.

10. The carrier according to claim 9, wherein each of said braces is affixed to side supports and said base opposite to said depressions.

11. The carrier according to claim 10, wherein each of said slots depend inwardly and downwardly from said opposite edges at an angle of 20 degrees.

* * * * *